United States Patent [19]
Allison et al.

[11] Patent Number: 5,421,613
[45] Date of Patent: Jun. 6, 1995

[54] TRACTOR TRAILER

[75] Inventors: Blaine H. Allison, Gainesville, Ga.; Ronald B. Gerding, Ooltewah, Tenn.

[73] Assignee: The Heil Company, Chattanooga, Tenn.

[21] Appl. No.: 208,054

[22] Filed: Mar. 8, 1994

Related U.S. Application Data

[63] Continuation of Ser. No. 807,499, Dec. 16, 1991, abandoned.

[51] Int. Cl.6 ............................................. B62D 21/20
[52] U.S. Cl. .................................... 280/789; 280/781
[58] Field of Search ............... 280/789, 676, 788, 426, 280/442, 781, 792; 180/24.01, 24.09, 23

[56] References Cited

U.S. PATENT DOCUMENTS

| | | | |
|---|---|---|---|
| 1,399,201 | 12/1921 | Fekete et al. | 280/781 |
| 1,629,234 | 5/1927 | Sturt et al. | 280/781 |
| 1,761,334 | 6/1930 | Fry | 280/781 |
| 1,917,962 | 7/1933 | Forrest | 280/781 |
| 1,976,071 | 10/1934 | Hoffman | 280/781 |
| 2,041,936 | 5/1936 | Kliewer | 280/781 |
| 2,879,076 | 3/1959 | Stricker, Jr. | 280/676 |
| 2,933,328 | 4/1960 | McIntyre et al. | 280/789 |
| 3,268,237 | 8/1966 | Van der Lely et al. | 280/704 |
| 3,921,999 | 11/1975 | Masser | 280/676 |
| 4,576,398 | 3/1986 | Kinne | 280/789 |
| 4,941,671 | 7/1990 | Ellingsen | 180/24.01 |

FOREIGN PATENT DOCUMENTS

| | | | |
|---|---|---|---|
| 959514 | 12/1974 | Canada | 280/789 |
| 2585999 | 2/1987 | France | 280/789 |
| 2620998 | 3/1989 | France | |

*Primary Examiner*—Karin L. Tyson
*Attorney, Agent, or Firm*—McAndrews, Held & Malloy

[57] ABSTRACT

A lightweight, stable, maneuverable tractor trailer having a frame with a front end, a rear end and two side rails. The rear end of the frame is about twice the width of the front end and the side rails each lie in a vertical plane that is disposed at an acute angle relative to the central longitudinal axis of the frame. Single tire mount wheel and axle subassemblies are mounted to the frame. These subassemblies reduce the tare weight of the tractor trailer and additionally permit the wider frame to be utilized.

8 Claims, 8 Drawing Sheets

TRACTOR TRAILER

This is a continuation of application Ser. No. 07/807,499 filed Dec. 16, 1991, now abandoned.

BACKGROUND OF THE INVENTION

This invention relates to "over-the-road" highway vehicles, and more particularly, to tractor trailers that are adapted to run over highways behind truck tractors and that may be used to haul a variety of relatively heavy loads of materials, freight, etc.

The Federal Government, and to a lesser extent, state and local governments, have mandated limits on the maximum gross weights for over-the-road trucks. In 1974, interstate regulations went into effect, allowing 20,000 pounds on a single axle, 34,000 pounds on a tandem axle and 80,000 pounds on gross combination weight for over-the-road trucks. At the same time, the so-called Federal "Bridge Formula" became law. The law relating to this formula states, in pertinent part, that: "no vehicle or combination of vehicles shall be moved or operated on any interstate highway when the gross weight of two or more consecutive axles exceeds the limitations prescribed by . . . the Bridge Gross Weight Formula." That formula is:

$$W = 500 [LN/N - 1 + 12N + 36]$$

Where:

W = the maximum weight, in pounds, that can be carried on any two axles to the nearest 500 pounds;

L = the spacing, in feet, between the outer axles of two or more consecutive axles; and N = the number of axles being considered.

Federal law also defines "tandem axle" as any two or more consecutive axles whose centers are not more than ninety-six inches apart. Hence, if a truck includes tandem axles, as thus defined, the 34,000 pound federal maximum gross weight limitation applies. If not, the Bridge Formula applies.

These governmental regulations, including the Bridge Formula, have for years dictated parameters involved in the design of over-the-road trucks. The obvious goal of heavy truck design has been to have a truck that is "legal" (that is, complies with governmental regulations) and that has a gross weight as close to the regulatory limits as practicable while still achieving a profitable net weight or "payload." Under the regulations, a truck's allowable gross weight increases, for a given truck length, as the number of axles used increases up to the 80,000 maximum limit. In the past, there has been a practical limit to adding axles to the "standard" rectangularly configured tractor trailer design. The axles themselves, and their associated components, add weight to the truck thereby reducing the truck's net weight or available "payload."

In co-pending U.S. Blain H. Allison et al. patent application Ser. No. 618,714, filed Nov. 27, 1990, a tractor trailer dump truck is disclosed. This dump truck has a non-rectangular configured trailer for the stated purpose of improving the maneuverability of the trailer while carrying relatively heavy payloads.

SUMMARY OF THE INVENTION

In principal aspect, the present invention is an improved tractor trailer having greater stability and a lighter weight than conventional tractor trailers of similar lengths. This improved tractor trailer is designed to comply with the Federal Gross Weight regulations, including the Federal Bridge Formula, while maximizing the tractor trailer's gross weight and minimizing the tractor trailer's tare weight so that the payload of material, freight, etc. that may be hauled by the improved tractor trailer is maximized.

These important advantages and benefits are achieved by making the improved tractor trailer wider at its rear end than at its front end. The increased width of the rear end increases the stability of the tractor trailer by providing a wider base for the trailer bed. The improved tractor trailer also employs wheel and axle subassemblies that utilize only a pair of single tires, as opposed to conventional dual tire sets, on the ends of their axle tubes. This significantly reduces the weight of the tractor trailer while still permitting the tractor trailer to haul relatively high payloads.

Accordingly, it is an object of the present invention to provide a stable, maneuverable tractor trailer that may be used for legally hauling relatively heavy payloads in conformance with the federal gross weight limitations, including the Federal Bridge formula.

Another object of the present invention is to provide an improved tractor trailer of the type described where the tractor trailer includes a frame assembly having a front end, a rear end, and first and second side rail subassemblies that each extend from the front end to the rear end and that are each substantially disposed in a vertical plane; where the width of the rear end is approximately twice the width of the front end, where the length of the tractor trailer is approximately four and one-half times the width of the rear end; and where each vertical plane of the side rail subassemblies is disposed at an acute angle with respect to the central longitudinal axis of the trailer frame assembly.

A related object of the present invention is to provide a novel, improved tractor trailer of the type described where the tractor trailer has at least two pairs of suspension subassemblies mounted to the side rail subassemblies with one member of each pair being mounted to the first side rail subassembly and the second member of each pair being mounted to the second side rail subassembly; where the first pair of suspension subassemblies is mounted adjacent the rear end of the body assembly and the second pair of suspension subassemblies is mounted forward of the first pair; where the distance between each member of the first pair is greater than the distance between each member of the second pair; where each pair of suspension subassemblies mounts a lightweight wheel and axle subassembly adapted to carry the tractor trailer on and over interstate highways; where each wheel and axle subassembly includes an axle tube that has a spindle mounted on each end, with each of the spindles being designed for a single tire mounting.

A further object of the present invention is to provide an improved tractor trailer of the type described where the tractor trailer may be hauled behind a conventional truck tractor having tandem axles mounted on its rear end, each axle having dual tires at each axle end; and where a steerable wheel and axle subassembly may be mounted either on the rear most end of the truck tractor or on the forward most end of the front end, adjacent to a third wheel and axle subassembly, on the tractor trailer so as to facilitate the maneuvering of the truck tractor and tractor trailer.

These and other objects, advantages and benefits of the present invention will become apparent from the following description of the preferred embodiment of the invention as illustrated in the drawings next described.

DETAILED DESCRIPTION OF THE PREFERRED EMBODIMENT

Figure 1:
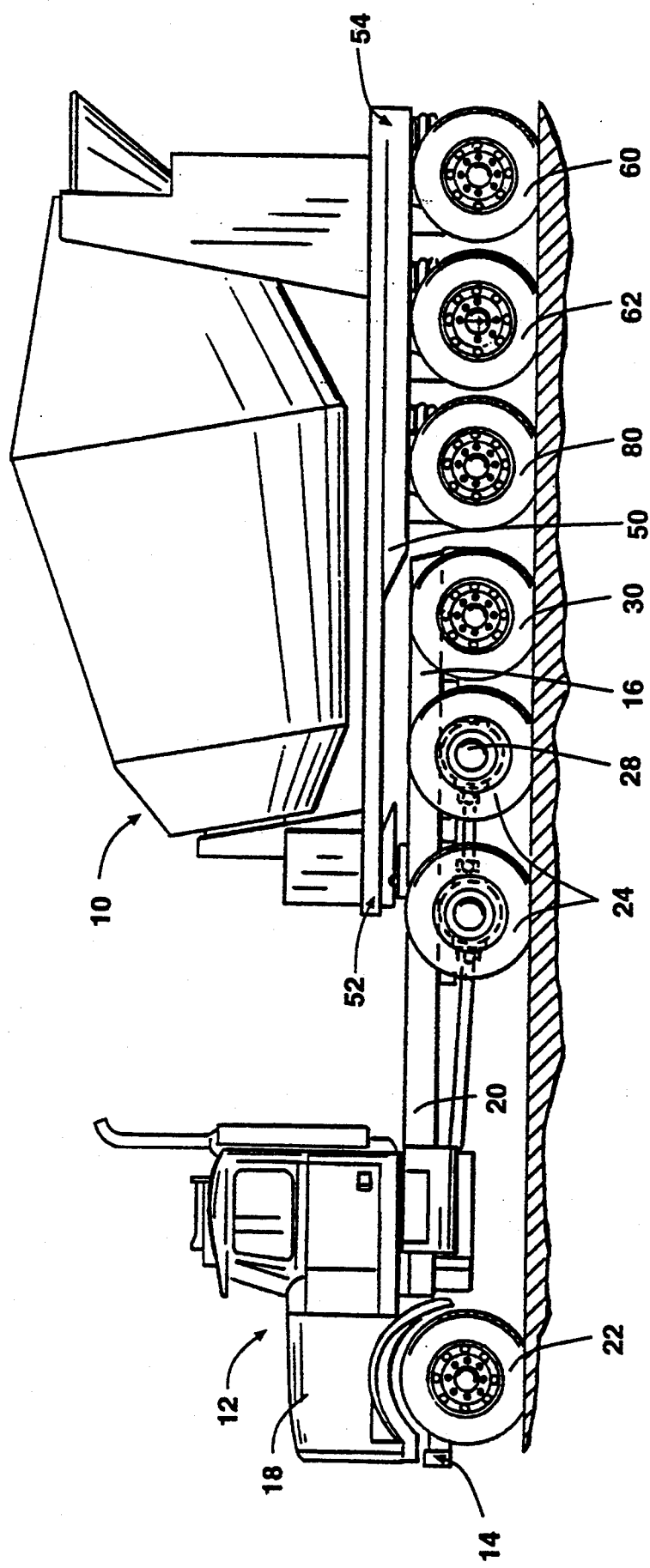
FIG. 1 is a side view of a truck tractor and tractor trailer that embodies the present invention.

Referring to FIG. 1, the invention is embodied in a tractor trailer 10, which is mounted on a conventional truck tractor 12. Although the tractor trailer shown is a cement transit mixer, the invention may be embodied in other vehicle constructions.

The truck tractor 12 includes a front end 14 and a rear end 16, and a cab 18 mounted on a chassis 20. A conventional front steering wheel and axle subassembly 22 is mounted on the front end 14 and a conventional tandem drive wheel and axle subassembly 24 is mounted on the rear end 16 of truck tractor 12.

Figure 2:
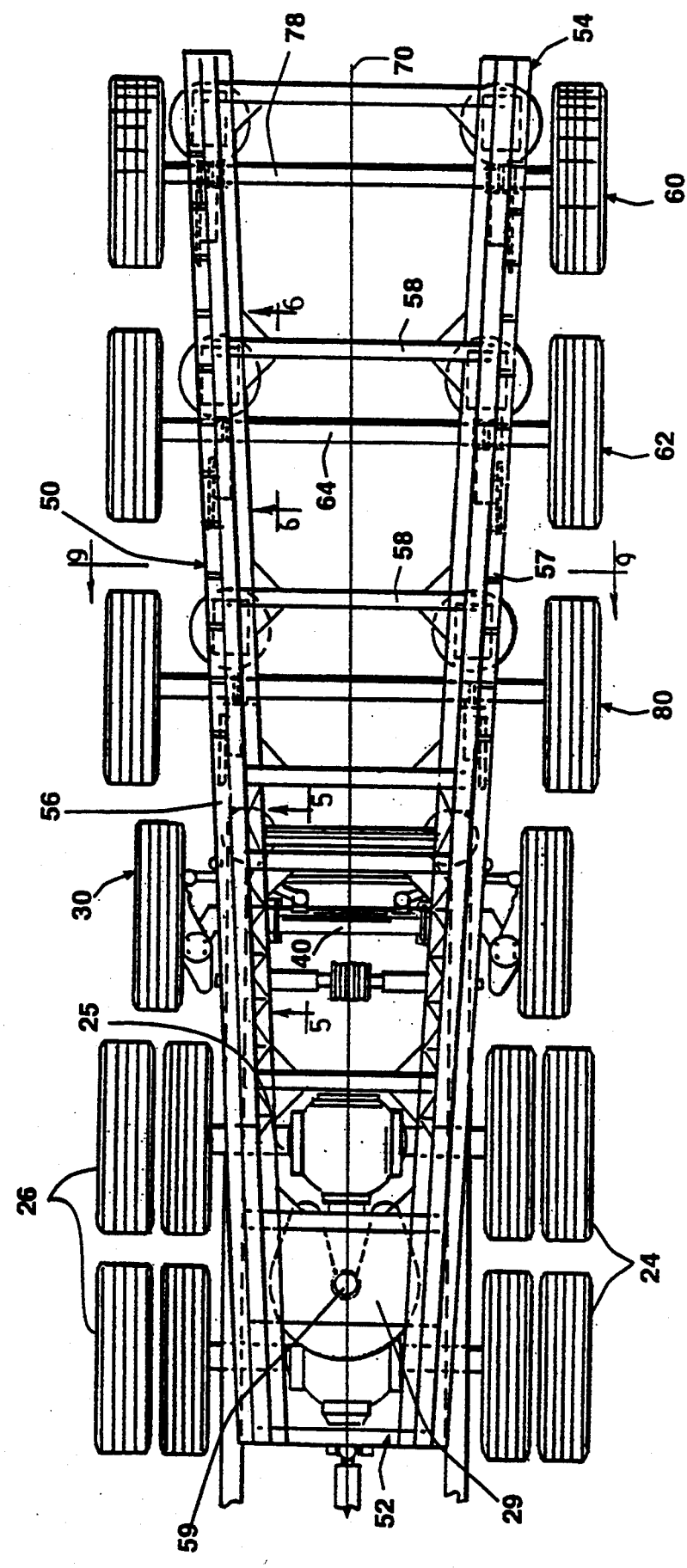
FIG. 2 is a partial top view of the tractor trailer with the cement transit mixer, shown in FIG. 1, being omitted so as to better show the details of the frame of the tractor trailer.

As best seen in FIG. 2, the tandem drive wheel and axle subassembly 24 includes two axle tubes 25 of substantially equal length and dual tires 26 mounted on spindles 28 (see FIGS. 1 and 3) at each end of each axle tube 25. A typical fifth wheel assembly 29 for connecting the truck tractor to the tractor trailer 10 is mounted on the chassis 20 between the axles of the tandem drive wheel and axle subassembly 24.

An auxiliary wheel and axle subassembly 30 is mounted on the rear end 16 of the truck tractor 12, rearwardly of the tandem drive wheel and axle subassembly 24. The auxiliary wheel and axle subassembly is a steerable subassembly and preferably a self-steering subassembly.

Figure 5:
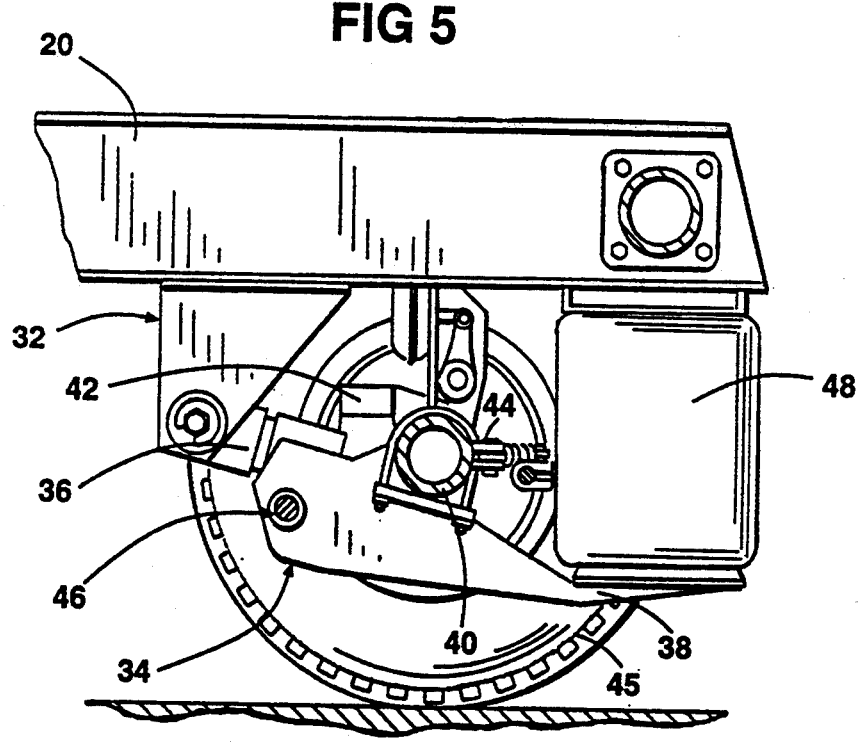
FIG. 5 is a partial, cross-sectional view taken along the line 5—5 in FIG. 2.
Figure 8:
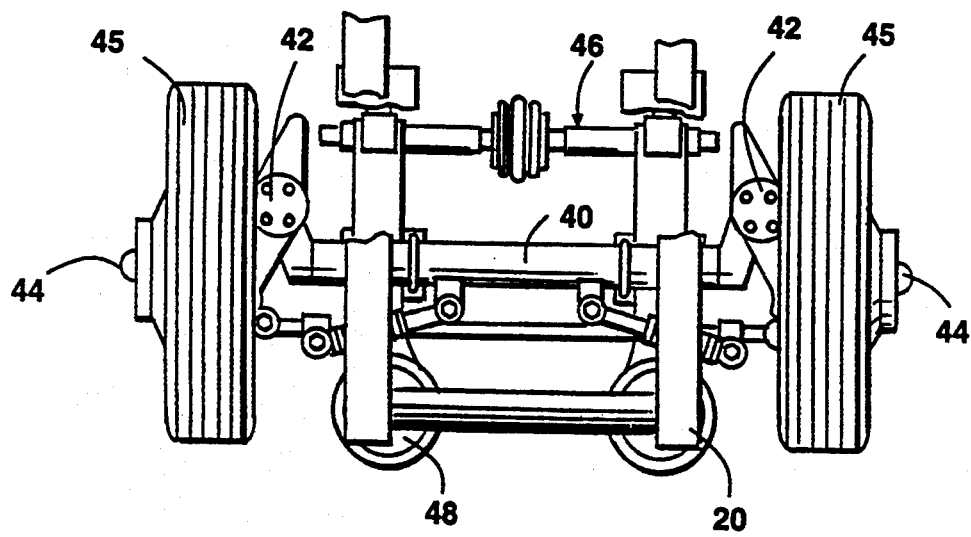
FIG. 8 is a partial, cross-sectional view taken along the long 8—8 in FIG. 3.

As shown in FIGS. 5 and 8, the auxiliary wheel and axle subassembly 30 includes a frame 32 attached to the truck chassis 20. The frame 32 pivotally mounts a pair of support arm assemblies 34 on the depending ends thereof, as best seen in FIG. 5. Each of the support arm assemblies 34 includes a mounting 36 and a support arm 38. An axle tube 40 is mounted between the support arms 38 and oriented perpendicular to the central longitudinal axis of the truck tractor 12. A pair of king pin assemblies 42 are mounted on opposite ends of the axle tube 40, and each king pin assembly 42 mounts a support spindle and hub assembly 44 which trails the king pin assembly 42. This trailing design causes the wheel and axle subassembly 30 to automatically steer when the truck tractor 12 is moving forwardly.

While the trailing axle design works while the vehicle is moving forwardly, it does not while the vehicle is backing. In order to hold the tires straight ahead during backing, a tire straightening assembly 46 is mounted to the support arms 38. The tire straightening assembly is described in more detail in co-pending U.S. Allison et al. patent application Ser. No. 618,714, filed Nov. 27, 1990.

Figure 4:
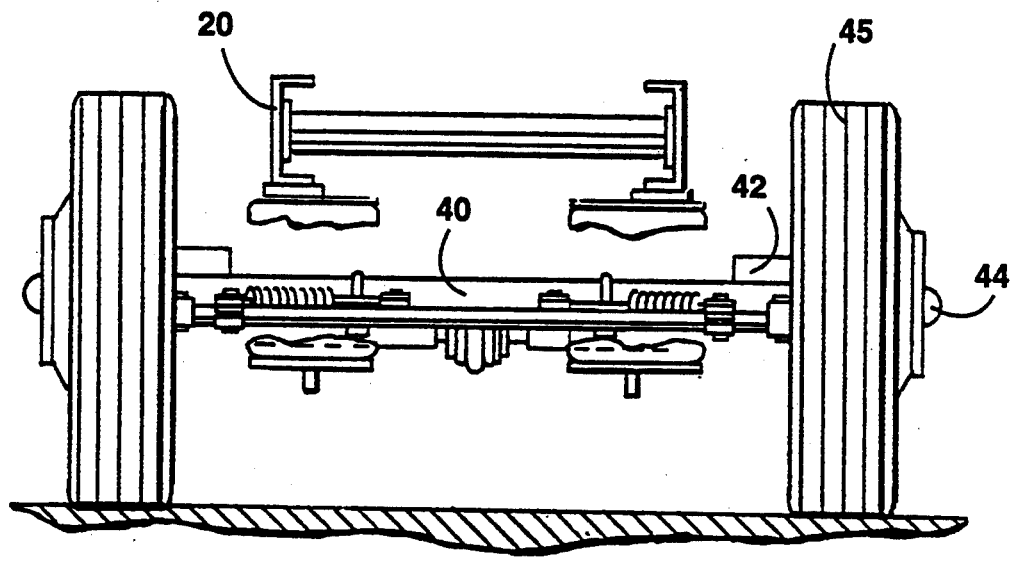
FIG. 4 is a view taken along the line 4—4 in FIG. 3.

As seen in FIGS. 4 and 8, each support spindle and hub assembly 44 mounts a single tire 45 thereon. Thus, the auxiliary wheel and axle subassembly 30 has a lighter weight than that associated with dual mounting subassemblies and, consequently, permits a bigger vehicle payload.

Conventional shocks, such as air bag springs 48, connect the support arm 38 to the truck chassis 20 to provide the necessary springing for the auxiliary wheel and axle subassembly 30 during use.

Figure 3:
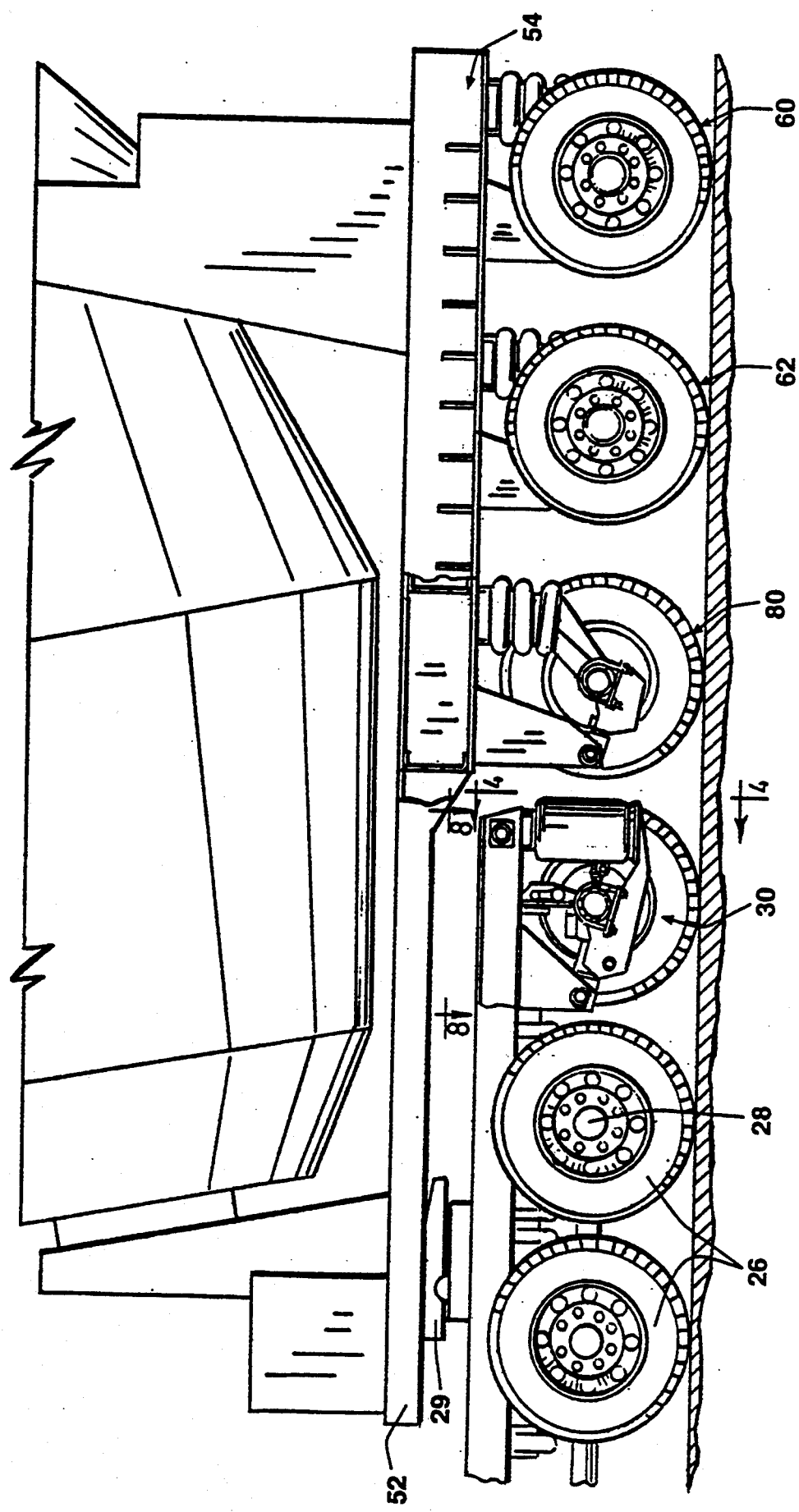
FIG. 3 is a enlarged side view of the tractor trailer with portions of the trailer frame being broken away for clarity.

The tractor trailer 10 as seen in FIGS. 1–3 has a frame assembly 50 that includes a front end 52, a rear end 54 wider than the front end 52, and first and second side rail subassemblies 56 and 57, respectively, that extend from the front end 52 to the rear end 54. At least two wheel and axle subassemblies 60 and 62 support the frame assembly 50 for movement over the highways.

The frame assembly as seen in FIG. 2 has a central longitudinal axis 70 extending between the front and rear ends 52 and 54, respectively. The side rail subassemblies 56 and 57 each lie substantially in a vertical plane disposed at an acute angle with respect to the central longitudinal axis 70, so that the frame assembly 50 is trapezoidal. The side rail subassemblies 56 and 57 are maintained in spaced apart position by cross members 58. The narrower front end 52 has a width less than or equal to the width of the truck chassis 20 so that the front end 52 can fit between the tires of the tandem drive wheel and axle subassembly 24. Preferably, the front end 52 will be approximately thirty-four inches wide. The front end 52 also includes a conventional king pin assembly 59 mounted thereon for connection to the fifth wheel assembly 29 on the truck tractor 12.

The rear end 54 is preferably about sixty inches wide, approximately twice the width of the front end, resulting in a frame assembly that has greater stability than a conventional rectangularly shaped frame assembly. Typically, a conventional tractor trailer has a rear end that is only about forty-two inches wide. It has also been found that the payload of material and the stability of the tractor trailer are maximized when the length of the frame assembly 50 is approximately four and one-half times the width of the rear end 54.

The wheel and axle subassemblies 60 and 62 are mounted adjacent the rear end 54 of the frame assembly 50 so that their longitudinal axes are perpendicular to the central longitudinal axis 70 and so that the wheel and axle subassembly 62 is forward of and adjacent to the wheel and axle subassembly 60. Because the rear end 54 of the frame assembly 50 is wider than that of conventional tractor trailers, the trailer of the present invention requires special wheel and axle subassemblies to accommodate the extra width of the rear end 54.

Figure 9:
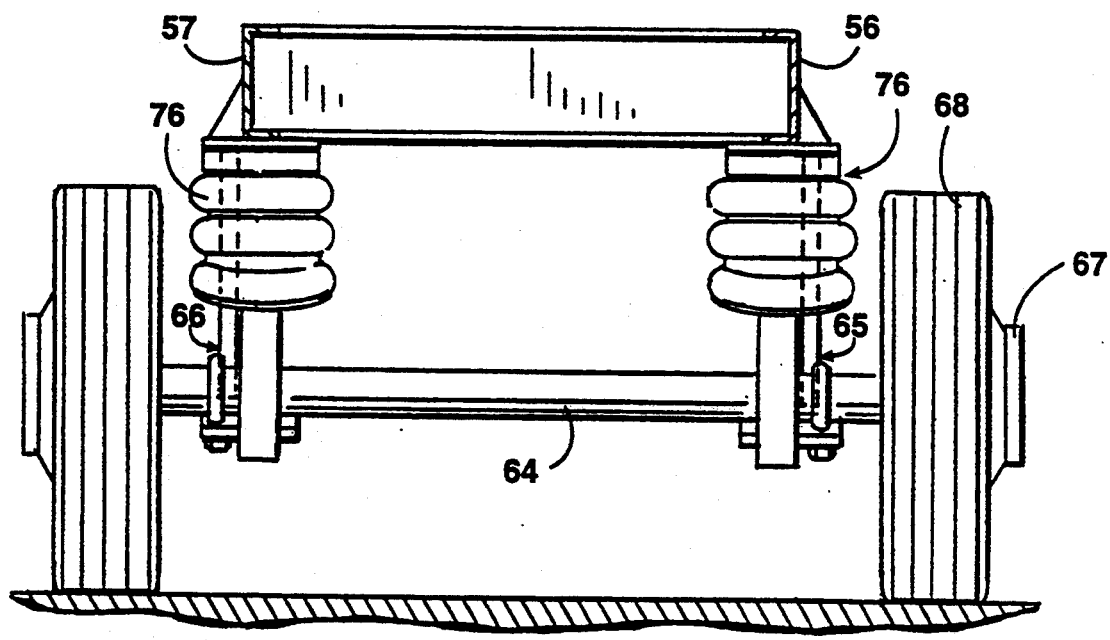
FIG. 9 is a partial, cross-sectional view taken along the line 9—9 in FIG. 2.
Figure 6:
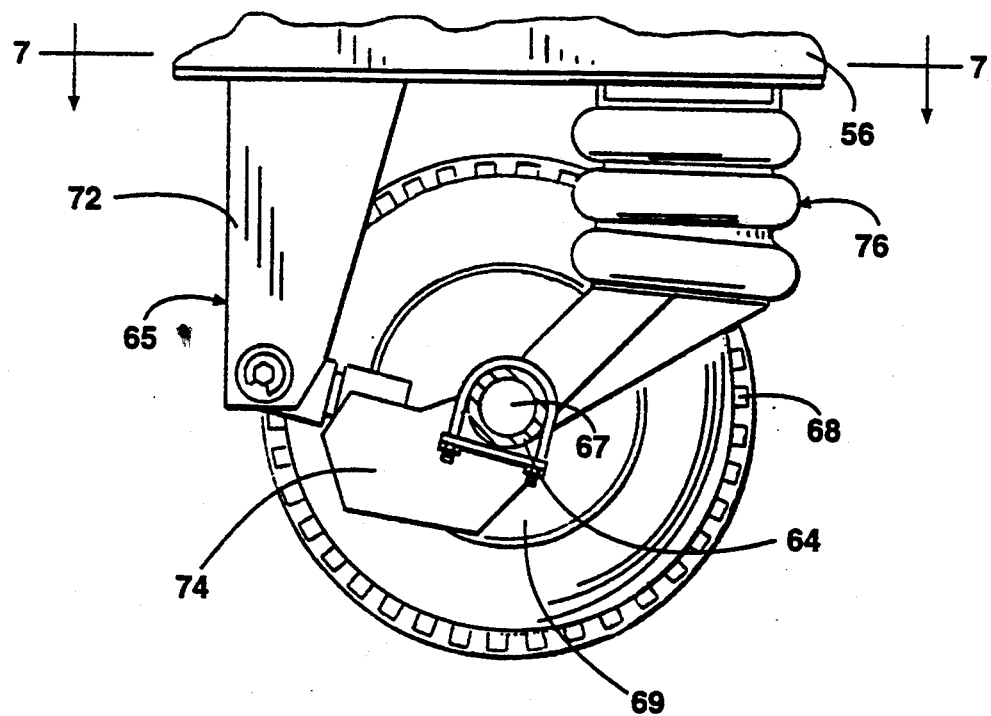
FIG. 6 is a partial, cross-sectional view taken along the lines 6—6 in FIG. 2.
Figure 7:
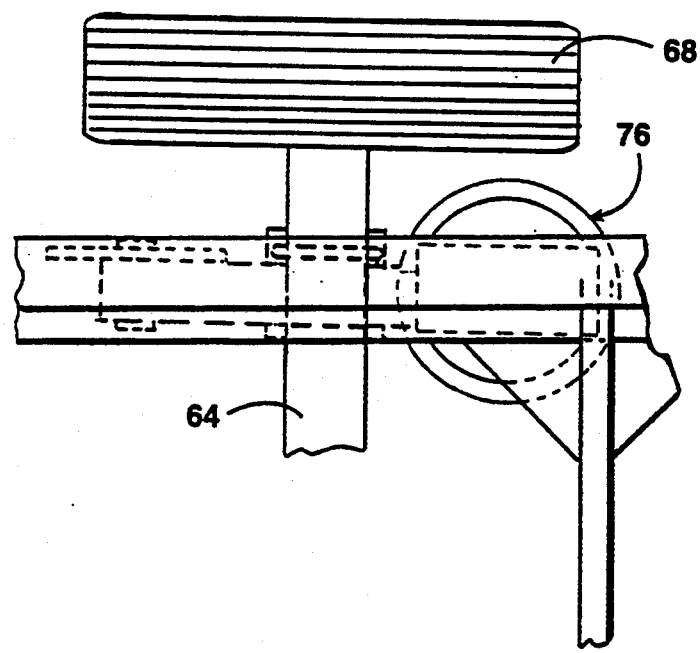
FIG. 7 is a partial, cross-sectional view taken along the line 7—7 in FIG. 6.

The wheel and axle subassembly 62 seen in FIGS. 6, 7 and 9 includes an axle tube 64 mounted to a pair of conventional suspension subassemblies 65, 66, and a fixed spindle 67 mounted at each end of the axle tube 64. The axle tube 64 preferably has a circular transverse cross-section and a diameter of about five inches. It has been found to be convenient to make the axle tube 64 by modifying a conventional axle tube from a tractor front wheel and axle subassembly by lengthening the axle tube and changing the transverse cross-section from an I-shape to a circular shape.

The wheel and axle subassembly 62 is designed to be lightweight in order to maximize the available payload. Each of the spindles mounts a single tire 68 and thus has a lighter weight than that associated with spindles for dual tire mountings. A conventional brake and hub subassembly 69, sized for single tire mounting, is mounted on each of the spindles. Because the brake and hub assembly 69 is sized for single tire mounting, it also has a lighter weight than that associated with dual tire brake and hub assemblies.

As best seen in FIG. 6, the suspension subassembly 65 includes a support beam 72 mounted on the side rail subassembly 56 and which depends there below, and a support arm 74 which extends rearwardly from the depending end of the support beam 72. The axle tube 64 is mounted between the support arms 74 and oriented perpendicular to the longitudinal axis 70. The suspension subassembly 65 also includes a spring unit 76 which connects the axle tube 64 with the side rail subassembly 56 to spring the wheel and axle subassembly. While the spring unit 76 may be any convenient spring arrangement, it is illustrated as an air bag arrangement.

The wheel and axle subassembly 60 has the same construction as the wheel and axle subassembly 62. However, because of the trapezoidal shape of the frame assembly 50, the distance between the support beams and support arms of the suspension subassemblies that mount the axle tube 78 of the wheel and axle subassembly 60 will be greater than the distance between the support beams 72 and support arms 74 of the suspension subassemblies 65, 66 that mount the axle tube 64 of the wheel and axle subassembly 62, as seen in FIG. 2.

In order to maximize the permissible gross load a vehicle may carry, it may be desirable to add a third wheel and axle subassembly to the tractor trailer. As seen in FIGS. 1–3, this third wheel and axle subassembly 80 is mounted on the frame assembly 50 forward of and adjacent to the wheel and axle subassembly 62. The wheel and axle subassembly 80 has the same construction as the wheel and axle subassembly 62 previously described, except that the distance between the support beams and support arms of the suspension subassemblies 65, 66 is greater than the distance between the support beams and support arms of the suspension subassemblies that mount the third wheel and axle subassembly 80.

Figure 10:
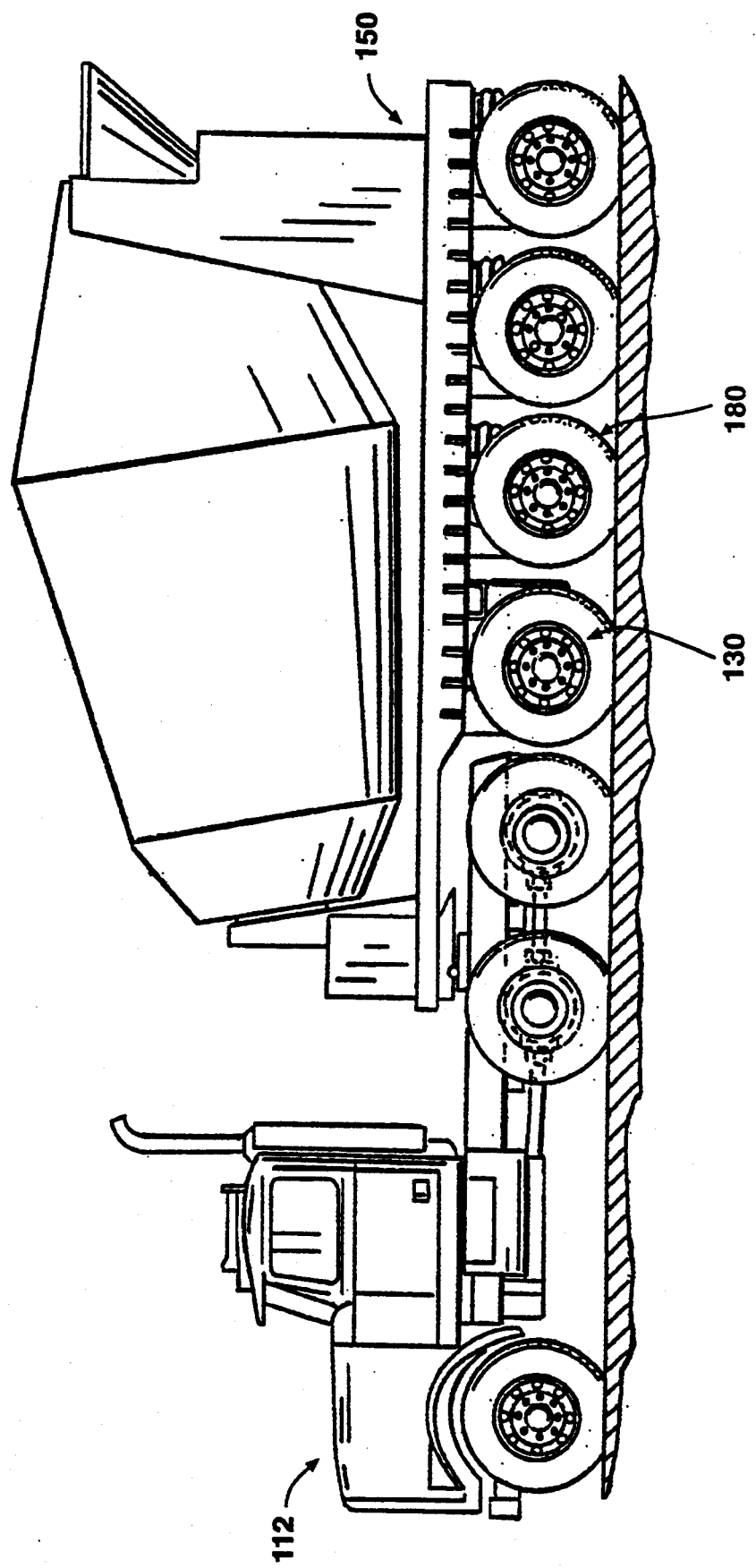
FIG. 10 is a side view, similar to FIG. 1, showing a modified tractor truck and tractor trailer.
Figure 11:
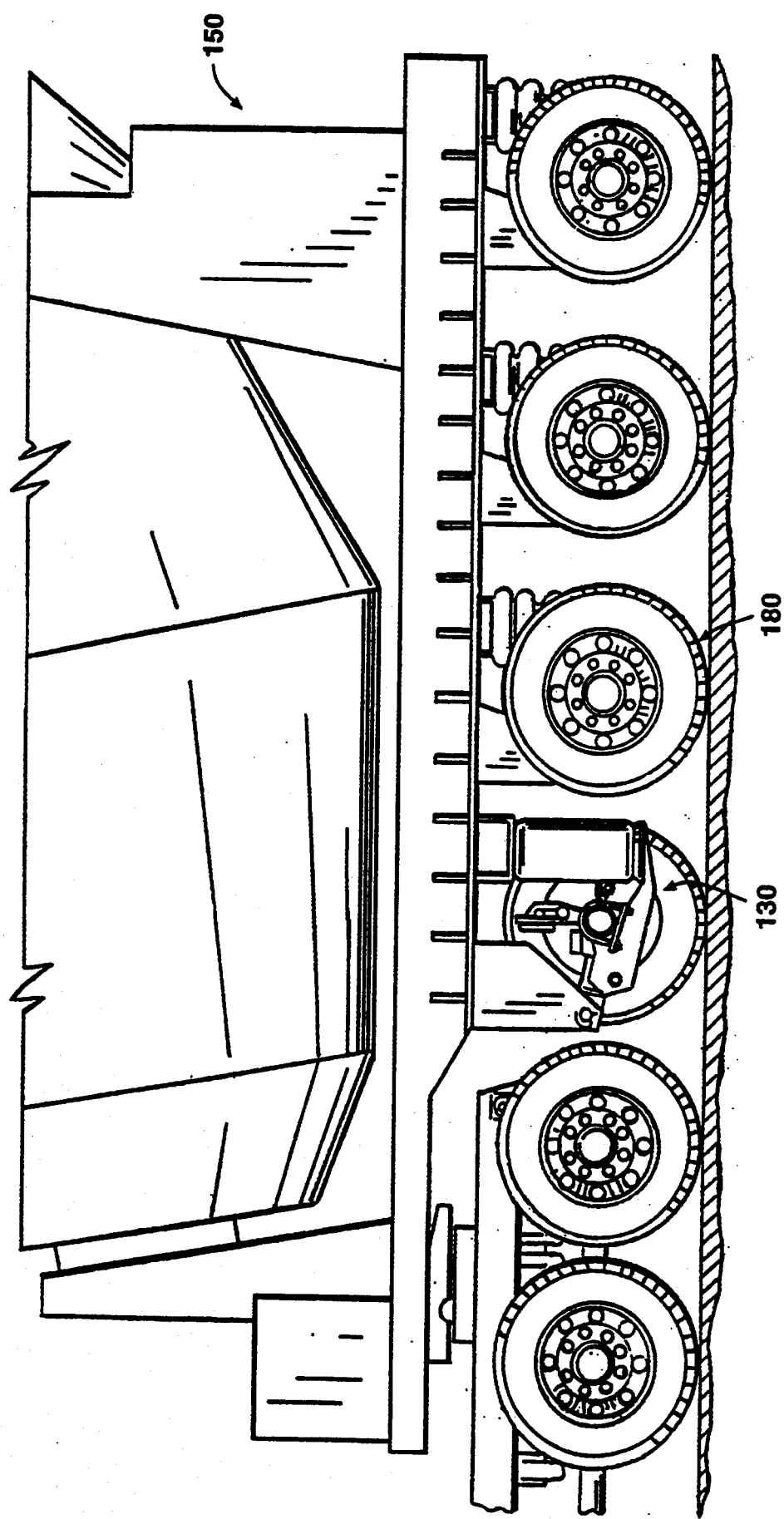
FIG. 11 is an enlarged side view, generally similar to FIG. 3, of the modified truck tractor and tractor trailer of FIG. 10.

Turning to FIGS. 10 and 11, an alternative arrangement for the wheel and axle subassemblies is shown. In the alternative embodiment, the auxiliary wheel and axle subassembly 130 is mounted on the frame assembly 150 forward of and adjacent to the third wheel and axle subassembly 180, rather than on the truck tractor 112. The construction of the auxiliary wheel and axle subassembly 130 is the same as that previously described for the auxiliary wheel and axle subassembly 30 shown in FIGS. 4, 5 and 8. The wheel and axle subassembly 180 has the same construction as that described for the wheel and axle subassembly 62. However, because of the trapezoidal shape of the frame assembly 150, the distance between the support arms of the suspension subassemblies that mount the axle tube of the wheel and axle subassembly 180 will be greater than the distance between the support arms that mount the auxiliary wheel and axle subassembly 130.

The preferred embodiments have been described and constitute the best mode presently contemplated by the inventors for carrying out their invention. It will be understood that the description of the preferred embodiments is for the purpose of illustration, and that the invention is to be limited in scope only by the following claims.

We claim:

1. A stable, maneuverable industrial tractor trailer designed specifically for hauling maximum heavy loads permitted under the federal interstate maximum gross weight and federal bridge formula requirements and for dumping such loads in on road and off road situations comprising:

a frame assembly having: a front end that has a predetermined width and that includes means for connecting the frame assembly with a truck tractor; a rear end that has a predetermined width; a predetermined length, taken along its longitudinal central axis between its front and rear ends; first and second side rail subassemblies that extend from the front end to the rear end, that are spaced apart one from the other at the front end and rear ends, and that each are substantially disposed in a vertical plane, with the width of the rear end being approximately twice the width of the front end, with the length of the frame assembly being approximately four and one-half times the width of the rear end and with each of the vertical planes being disposed at an acute angle with respect to the central longitudinal axis of the frame assembly such that the frame assembly provides a stable base for hauling and dumping such heavy loads;

first and second pairs of suspension subassemblies mounted to the side rail subassemblies with the first member of each pair being mounted to the first side rail subassembly and the second member of each pair being mounted to the second side rail subassembly a predetermined distance from the first member, with the first pair of suspension subassemblies being mounted adjacent to the rear end of the body assembly, and with the second pair of suspension subassemblies being mounted forward of and adjacent to the first pair of suspension subassemblies, with the distance between the first and second members of the first pair of suspension subassemblies being greater than the distance between the first and second members of the second pair of suspension subassemblies;

first and second tandem wheel and axle subassemblies mounted on the first and second pairs of suspension subassemblies, respectively, so that their longitudinal axes are substantially perpendicular to the central longitudinal axis of the frame assembly and so that the wheel and axle subassemblies are adapted to carry the tractor trailer on and over highways;

each of the first and second wheel and axle subassemblies including: an axle tube; a single tire spindle mounted in opposite ends of the axle tube; and a single tire hub and brake assembly mounted on each of the spindles.

2. The tractor trailer of claim 1 wherein the tractor trailer is connected with a truck tractor that has a front end, a rear end, and a cab; wherein the rear end of the tractor truck includes means for connecting the truck tractor with the connection means of the frame assembly; wherein a steerable wheel and axle subassembly is mounted at the front end of the truck tractor; wherein the steerable wheel and axle subassembly includes an axle tube, a single tire spindle mounted at opposite ends of the axle tube, and a single tire hub and brake assembly mounted on each of the spindles; two other wheel and axle subassemblies are mounted on the rear end of the truck tractor; wherein each of the two other wheel and axle subassemblies includes: an axle tube, a dual tire spindle mounted in opposite ends of the axle tube and a dual tire hub and brake assembly mounted on each of the spindles.

3. The tractor trailer of claim 2 wherein an auxiliary pair of steerable wheel suspension subassemblies is mounted to the side rail subassemblies; an auxiliary steerable wheel and axle subassembly is mounted on the auxiliary steerable wheel suspension subassemblies so that its longitudinal axis is perpendicular to the central longitudinal axis of the frame assembly; and Wherein the auxiliary steerable wheel and axle subassembly includes: an axle tube, a single tire spindle mounted in opposite ends of the axle tube and a single tire hub and brake assembly mounted on each of the spindles.

4. The trailer of claim 2 wherein the truck tractor includes an auxiliary steerable wheel and axle subassembly mounted on the rear end of the truck tractor to the rear of the two other wheel and axle subassemblies; wherein the auxiliary steerable wheel and axle subassembly of the truck tractor includes an axle tube, a single tire spindle mounted in opposite ends of the axle tube and a single tire hub and brake assembly mounted on each of the spindles; and wherein the axle tube of the first wheel and axle subassembly has a length greater than the length of the axle tube of the auxiliary steerable wheel and axle subassembly;

5. A stable,-maneuverable industrial tractor trailer designed specifically for hauling maximum heavy loads permitted under the federal interstate maximum gross weight and federal bridge formula requirements and for dumping the loads in on road and off road situations comprising:

a frame assembly having: a front end that has a predetermined width and that includes means for connecting the frame assembly with a truck tractor; a rear end that has a predetermined width; a predetermined length, taken along its longitudinal central axis between its front and rear ends; first and second side rail subassemblies that extend from them front end to the rear end and that each are substantially disposed in a vertical plane, with the width of the rear end being approximately twice the width of the front end, with the -length of the frame assembly being approximately four and one-half times the width of the rear end and with each of the vertical planes being disposed at an acute angle with respect to the central longitudinal axis of the frame assembly such that the frame assembly provides a stable base for hauling and dumping the heavy loads;

first and second pairs of suspension subassemblies mounted to the side rail subassemblies with the first member of each pair being mounted to the first side rail subassembly and the second member of each pair being mounted to the second side rail subassembly a predetermined distance from the first member, with the first pair of suspension subassemblies being mounted adjacent to the rear end of the body assembly, and with the second pair of suspension subassemblies being mounted forward of and adjacent to the first pair of suspension subassemblies, with the distance between the first and second members of the first pair of suspension subassemblies being greater than the distance between the first and second members of the second pair of suspension subassemblies;

first and second tandem wheel and axle subassemblies mounted on the first and second pairs of suspension subassemblies, respectively, so that their longitudinal axes are substantially perpendicular to the central longitudinal axis of the frame assembly and so that the wheel and axle subassemblies are adapted to carry the tractor trailer on and over highways;

each of the first and second wheel and axle subassemblies including: an axle tube; a single tire spindle mounted in opposite ends of the axle tube; and a single tire hub and brake assembly mounted on each of the spindles;

a pair of steerable wheel suspension subassemblies mounted to the side rail subassemblies forward of the second pair of suspension subassemblies, the pair of steerable wheel suspension subassemblies having a first member mounted to the first side rail subassembly and a second member mounted to the second side rail subassembly, with the distance between the first and second members of the pair of steerable wheels suspension subassemblies being less than the distance between the first and second members of the second pair of suspension subassemblies;

a steerable wheel and axle subassembly mounted on each of the steerable wheel suspension subassemblies so that its longitudinal axis is perpendicular to the central longitudinal axis of the frame assembly; the steerable wheel and axle subassembly including: an axle tube; a single tire spindle mounted in opposite ends of the axle tube; and a single tire hub and brake assembly mounted on each of the spindles; the axle tube of the first wheel and axle subassembly having a length greater than the length of the axle tube of the steerable wheel and axis subassembly.

6. The improved tractor trailer of claim 5 wherein a third-pair of suspension subassemblies is mounted to the side rail subassemblies; and a third tandem wheel and axle subassembly is mounted on the third pair of suspension subassemblies so that its longitudinal axis is substantially perpendicular to the central longitudinal axis of the frame assembly and so that the third wheel and axle subassembly is adapted to assist the first and second tandem wheel and axle subassemblies in carrying the tractor trailer on and over highways; wherein the third pair of suspension subassemblies is mounted forward of and adjacent to the second pair of suspension subassemblies; and the distance between the first and second members of the second pair of suspension subassemblies is greater than the distance between the members of the third pair of suspension subassemblies.

7. A stable, maneuverable industrial tractor trailer designed specifically for hauling maximum heavy loads permitted under the federal interstate maximum gross weight and federal bridge formula requirements, and for dumping such loads in on road and off road situations comprising:

a frame assembly having: a front end that has a predetermined width and that includes means for connecting the frame assembly with a truck tractor; a rear end that has a predetermined width; a predetermined length, taken along its longitudinal central axis between its front and rear ends; first and second side rail subassemblies that extend from the front end to the rear end and that each are substantially disposed in a vertical plane, with the width of the rear end being approximately twice the width of the front end, with the length of the frame assembly being approximately four and one-half times the width of the rear end, and with each of the vertical planes being disposed at an acute angle with respect to the central longitudinal axis of the frame assembly such that the frame assembly provides a stable base for hauling and dumping the heavy loads;

first, second, and third pairs of suspension subassemblies mounted to the side rail subassemblies with the first member of each pair being mounted to the first side rail subassembly and the second member of each pair being mounted to the second side rail subassembly a predetermined distance from the first member, with the first pair of suspension subassemblies being mounted adjacent to the rear end of the body assembly, with the second pair of suspension subassemblies being mounted forward of and adjacent to the first pair of suspension subassemblies, with the distance between the first and second members of the first pair of the suspension subassemblies being greater than the distance between the first and second members of the second pair of suspension subassemblies, and with the third pair of suspension subassemblies being mounted forward of and adjacent to the second pair of suspension subassemblies, with the distance between the first and second members of the second pair of suspension subassemblies being greater than the distance between the first and second members or the third pair of suspension subassemblies;

first, second, and third tandem wheel and axle subassemblies mounted on the first, second, and third pairs of suspension subassemblies, respectively, so that their longitudinal axes are substantially perpendicular to the central longitudinal axis of the frame assembly and so that the wheel and axle subassemblies are adapted to carry the tractor trailer on and over highways;

each of the first, second, and third wheel and axle subassemblies including: an axle tube; a single tire spindle mounted in opposite ends of the axle tube; and a single tire hub and brake assembly mounted on each of the spindles.

8. The trailer of claim 7 wherein a pair of steerable wheel suspension subassemblies is mounted to the side rail subassemblies; a steerable wheel and axle subassembly is mounted on the steerable wheel suspension subassemblies so that its longitudinal axis is substantially perpendicular to the central longitudinal axis of the frame assembly; and wherein the steerable wheel and axle subassembly includes: an axle tube, a single tire spindle mounted in opposite ends of the axle tube and a single tire hub and brake assembly mounted on each of the spindles.

* * * * *